Feb. 22, 1938.    N. G. WILLS    2,108,980
DENTAL MODEL SURVEYOR
Filed Aug. 6, 1934    2 Sheets-Sheet 1

INVENTOR.
Noble G. Wills

Patented Feb. 22, 1938

2,108,980

UNITED STATES PATENT OFFICE 2,108,980

DENTAL MODEL SURVEYOR

Noble G. Wills, Connersville, Ind.

Application August 6, 1934, Serial No. 738,612

3 Claims. (Cl. 32—67)

My invention relates to improvements in dental appliances and specifically to an instrument by means of which dental models may be rapidly, easily and accurately surveyed for certain types of artificial dentures.

This invention is intended particularly for paralleling the undesirable undercuts of the teeth to be clasped and also for charting the positions of clasps for the various types of removable dental restorations.

This invention will find for the operator all locations on a dental model that will retard or prevent placement of a partial removable dental restoration, and will assist the operator in the construction of a partial denture which will go into position with little or no grinding.

This invention will chart upon the teeth, markings showing their greatest diameters when in parallel relationship, assisting in the construction of a partial removable denture that will not cause undue strain upon the remaining natural teeth and will go into position without unnecessary force.

The main object of my invention is the provision of an instrument of the above described type which is simple and cheap to manufacture and at the same time accurate and positive in operation.

Another object of my invention is to produce an instrument of the class described which is extremely simple in operation, requiring a minimum number of operations to perform its functions.

A further object of the present invention is to provide an instrument of this class in which the tool is freely movable vertically to any position and may be freely swung in a horizontal direction in complete rotation about a rigid support at the side and also rotated about its own axis, the tool remaining at all times vertical in relation to the main base of the instrument.

It is still further an object to provide an instrument of this type which permits the master model to be moved easily so that it may be tripoded quickly and accurately and also when once the master model has been suitably located it may be fixed in that plane relative to the main base, the movable base and the vertical tool, and further, may be moved to any point over the surface of the main base without disturbing the plane of the dental model and the axis of the tripoded points relative to the main base and the vertical tool. The casting model may be accurately retripoded to agree with the original tripoded position of the master model.

Other objects will be in part obvious and in part pointed out more in detail hereinafter.

The invention as herein shown and described is illustrative of the preferred embodiment of the same, and is subject to various modifications of appearance and construction without departing from the spirit of the invention.

Referring to the drawings:—

Figure 1:
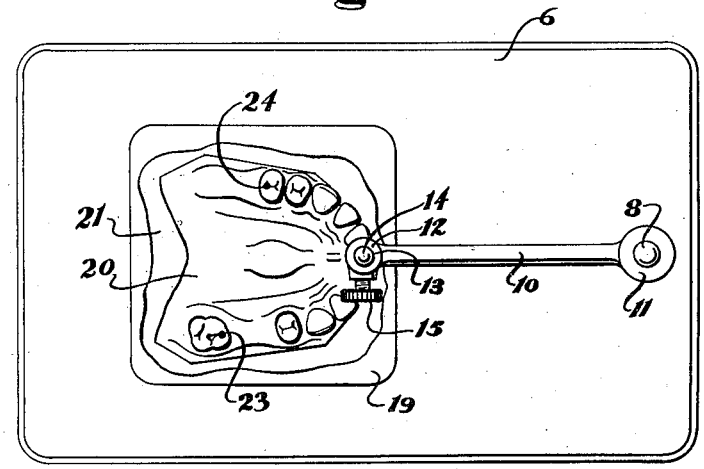
Fig. 1 is a plan view of the device with a dental model in place for surveying.

Referring to the drawings more in detail the invention consists of the following parts:—the main or stationary base 6 upon which is mounted the rigid, stationary and vertical post 7. The post 7 has at its upper end a shaft 8 and a shoulder 9, the shaft 8 is in vertical relation with the top surface of the main base. The horizontal arm 10 is provided with an integral sleeve portion 11 which is adapted to fit around the shaft 8 closely enough to allow the arm 10 to swing freely about the post 7 but without excess of play or looseness in order that the arm 10 will always remain parallel with the top surface of the base. The arm 10 is provided at the opposite end from the sleeve 11 with a second sleeve 12, the hole 13 therethrough being parallel with the hole 8. Hole 13 is of a suitable size to receive a tool holder 14 which is held tightly in place by means of the thumb screw 15 which is fitted into the side of the sleeve 12. The tool holder 14 has at its lower end a chuck 16 into which may be fitted the tools 17 and 18. The tool 17 is made of metal such as steel or stainless steel, and the tool 18 is made of lead or carbon and is used for marking purposes. These tools are of approximately the same length and diameter and are interchangeable in the chuck 16. Both tools have one end cut off square and one end 30 and 31 beveled in order to reach confined places easily. The top surface of the main base 6 is smooth and flat. The movable base 19 is also provided with a smooth flat surface in order that it will slide over the surface of the main base with a minimum of resistance.

Figure 2:
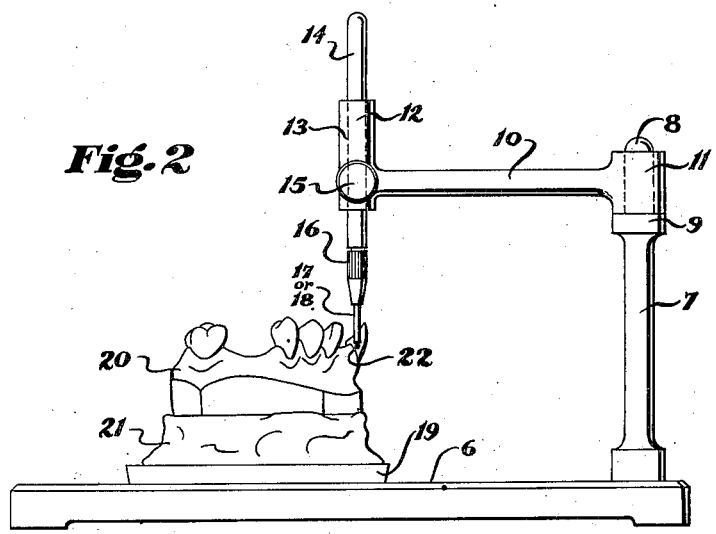
Fig. 2 is a side elevation of the device as shown in Fig. 1.

In using the device a master model 20 of the denture into which the artificial denture is to be fitted is made in the regular manner so that an exact reproduction is produced. The master model 20 is secured to the movable base 19 with a generous amount of modeling clay or other suitable plastic substance 21. The master model is first moved to a position approximately like that shown in Figs. 1 and 2. Next, a contact point upon the side of any remaining natural anterior tooth is selected in the space created by any missing teeth. If all anterior teeth are present, select a point at the median line using the interproximal gingival space or any definite point thought most suitable at the median line between the incisal edge and interproximal gingival space. This point is marked with a lead pencil and is designated by the numeral 22 in Fig. 2. With the steel tool 17 in position square cut end down in the chuck 16 the thumb screw 15 is loosened and the height of the tool holder 14 is adjusted until the tip of the tool 17 contacts the previously described, selected point. The thumb screw is then tightened securely. The point selected is called the anterior point of the tripod.

To select the other two points of the tripod slide the movable base around until the tooth upon one side of the jaw which is intended to be clasped comes beneath the tip of the tool 17. Select the point 23 on the marginal ridge on which it is desired to place the occlusal rest and mark with pencil, raise or lower the master model by manipulating the modeling clay beneath the model until the tip of the tool 17 contacts this point, meanwhile maintaining the point 22 in its previously fixed position, as by tilting the master model about point 22 as a pivot. This is the second point of the tripod. The third point 24 of the tripod is selected in the same manner as the second. During this operation the positions of the points 22 and 23 are maintained, as by manipulating the master model about an imaginary line passing through these two points. These points are then each equally distant from the surface of the main base 6 and the vertical axis of the tripod is vertical to the surface of the base 6 and parallel to the axis of the tool holder 14 and the tool 17.

Figure 3:
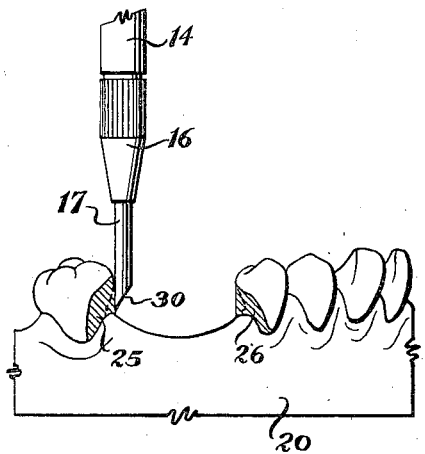
Fig. 3 is a partial elevation showing the tool in position and performing one of its functions.

With the master model in this position the mesial or distal undesirable undercuts are determined, filled with modeling clay as shown by the shaded portions 25 and 26 in Fig. 3, and paralleled by means of the steel tool 17. (At this stage the steel tool should be inserted with the beveled end downward.) This is easily accomplished by loosening the thumb screw and lowering the surveying arm and by sliding the movable base 19 upon the surface of the main base 6 and by swinging the surveying arm 14 and its tool 17 from side to side in order to reach all points of the teeth to be clasped.

After paralleling the undesirable undercuts the master model is removed and a duplicate casting model 27 (Fig. 4) is made therefrom. The duplicate casting model is identical in every respect to the master model except the undesirable undercuts are removed.

Figure 4:
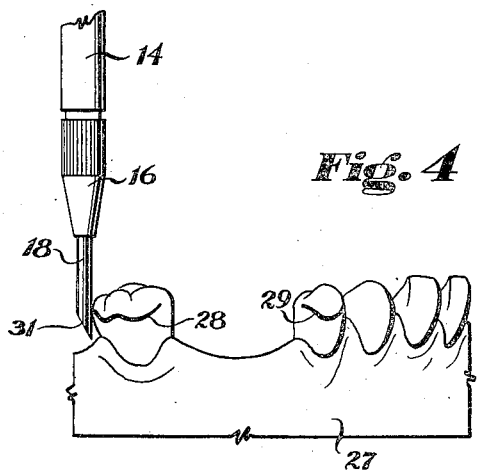
Fig. 4 is a partial elevation showing the tool performing another of its functions.

This casting model is mounted on the clay 21 and tripoded in the same manner as was the master model. After the casting model has been tripoded the carbon tool 18 is substituted for the steel tool 17, beveled end downward, and is used to determine and mark lines showing the greatest diameters of the teeth to be clasped when they are in parallel relationship. The vertical sides of the carbon are used to mark upon the teeth as illustrated in Fig. 4. The heavy lines 28 and 29 indicate the height of the lines of greatest diameters of the teeth to be clasped when in parallel relationship.

These lines will definitely establish all positions where clasps should be placed. The denture is then made by any one of the several methods.

What I claim is:

1. In a dental instrument of the type described, the combination of a main base, an upright carried by said base, an horizontal arm pivoted to said upright, tool holding means carried by said horizontal arm opposite said upright and having a tool supported therein, said tool being movable vertically relative to said base, locking means on said tool holding means for locking said tool at any selected height relative to the base, a secondary base carried on said main base and freely movable about the surface thereof and parallel thereto, nonhardening plastic means on said secondary base for supporting a dental model and allowing substantially universal angular adjustment thereof whereby a dental model pressed upon the plastic will adhere thereto and may be adjusted at any time to any suitable angle relative to the secondary base and the vertical tool.

2. In a dental instrument of the class described, a stationary base, an upright carried by said stationary base, an horizontal arm pivoted on said upright, a tool carried vertically by said horizontal arm for movement vertically and horizontally relative to the stationary base, a movable base carried upon said stationary base, a permanently plastic substance carried by said movable base for supporting a dental model and permitting substantially universal movement of said dental model at any time with respect to said movable base, whereby a desirable vertical angle upon said dental model may be determined and recorded thereon and whereby said dental model may be removed from the movable base and the instrument and may be replaced thereupon at any time in the same relation to the vertical angle as previously selected and recorded.

3. A dental surveying instrument having a base, an indicator, means for movably supporting said indicator in a position perpendicular to said base, and means including a table carried by said base and a mass of plastic material on said table for holding a dental model in any selected position on, and at any selected angle to, said indicator, said plastic material having sufficient adhesion to said model and sufficient stiffness to hold said model in adjusted position against lateral displacement with respect to the table, said mass of material having a thickness sufficient to raise the model above the surface of the table so that it can be tilted on said mass into any desired position with respect to the indicator.

NOBLE G. WILLS.